Sept. 26, 1967  R. E. BOWLES  3,343,790
VORTEX INTEGRATOR
Filed Aug. 16, 1965  2 Sheets-Sheet 1

INVENTOR
ROMALD E. BOWLES
BY Hurvitz & Rose
ATTORNEYS

Sept. 26, 1967 R. E. BOWLES 3,343,790
VORTEX INTEGRATOR

Filed Aug. 16, 1965 2 Sheets-Sheet 2

INVENTOR
ROMALD E. BOWLES

BY *Hurvitz + Rose*

ATTORNEYS

United States Patent Office 3,343,790
Patented Sept. 26, 1967

3,343,790
VORTEX INTEGRATOR
Romald E. Bowles, Silver Spring, Md., assignor to Bowles Engineering Corporation, Silver Spring, Md., a corporation of Maryland
Filed Aug. 16, 1965, Ser. No. 479,909
22 Claims. (Cl. 235—200)

The present invention relates to integrators and, more particularly, to a fluid vortex amplifier which is utilized to perform an integration function on fluid signals.

One form of integrator that is well known in this art is the simple electric or fluid "motor," driven by the signal to be integrated, since in such a device the rotational output is known to be a function of the rotating field produced and thus to the integral of the electrical or fluid input signal. However, these known types of integrators have proven to be limited in their ability to perform highly precise and accurate integration since they are fairly insensitive to sudden or large accelerations in the rotating field produced by the input signals. In other words, prior motor type integrators, especially in the fluid arts, have been subject to a great amount of slippage between the rotating field and the monitoring means for the rotating field, so that those skilled in this art have been forced to resort to other types of more complicated integrators where highly sensitive and thus highly precise and accurate integration is desired.

A recent development in the fluid art by myself and B. M. Horton, described in U.S. Patent No. 3,276,259 has produced a vortex amplifier which has a rotating fluid field induced by the input signals.

While our previous vortex amplifier represented an advance over the prior art in terms of sensitivity and accuracy, still much was left to be desired, since there was found to be still a degree of slippage between the rotating field and the monitoring means for the rotating field. Therefore, prior to this invention, it was believed, and indeed others in the art shared the opinion, that highly accurate and precise integration could not be obtained by use of a fluid motor device, especially where there were large accelerations in the rotating field, and this opinion had been held to such a degree that people skilled in the art could not imagine a vortex amplifier as a highly sensitive motor device, and thus as a precise and accurate integrator.

This opinion has been borne out by the more recent development of the vortex amplifier along the lines of a control element or valve rather than a motor device in which the axial component rather than the rotational component of the output flow is utilized for various control purposes. The advantages of the vortex valve such as high pressure gain and pressure recovery, as related to the axial component of the output flow, have been stressed in the most recent developments to the point where the rotational component of flow as a useful working output has been almost completely forgotten.

To explain further, let us consider the operation of a vortex amplifier in detail. In general, a vortex amplifier utilizes tangential control flow to control the direction and speed of rotation of a supply flow within a circular chamber, i.e. the control flow imparts a rotational component to the supply flow. As the combined flows pass through the chamber, the law of conservation of momentum requires that the tangential velocity and the angular velocity both increase as the flow proceeds inward towards the center. The resulting velocity differences between each annular layer cause shear stresses in the rotating mass whereby each layer shares its momentum with the adjacent layers. The energy increment involved in increasing the average velocity of the fluid in the chamber is supplied by the pressure drop in the power fluid.

The output signal of the amplifier, when it is utilized as a control device, is primarily in the form of a flow rate or a pressure signal involving only the axial component of flow from an output aperture, which is provided at the center of the amplifier vortex field where a change to a three-dimensional vortex takes place due to the "sink" flow from said aperture. When there is no control flow, the maximum flow passes through the valve and the total pressure at the output is greatest since there is no centrifugal field tending to separate the fluid molecules. As will be evident, the rotational component of flow has highly amplified tangential and angular velocities which occur in the region of the center or core of the vortex flow, defined generally by the cross-sectional area of said outlet aperture.

It has occurred to me that it would be very desirable to make use of this highly amplified rotational component of flow to produce an integrated output, if the previous difficulties of insensitivity caused by slippage that has characterized this type of integrator in the past could be overcome. With this in mind, I have discovered first that at the very high velocities which exist in the forced vortex core, as explained above, the effective or apparent viscosity of the fluid becomes very large due to the selective manner in which minimum energy level fluid flows towards the minimum discharge radius in this region; sometimes as large as a thousand times the anticipated effective viscosity. At such high viscous coupling, the velocity field has been found to be essentially like a solid body in rotation wherein the angular velocity is constant and the tangential velocity is a direct function of the radius at each annular ring or layer. Secondly, I have found that, if a suitable light-weight vane, resembling a cruciform, for example, is suspended by aerodynamic flow or the like within this region of solid body rotation or forced vortex flow, it follows the discharge conditions of the outlet aperture as though rigidly coupled to the flow of fluid, even under the conditions of high accelerations of oscillating output flow. This phenomena appears to be due, in part at least, to the fact that the same high viscous coupling forces that tend to keep each annular increment of fluid rotating at the same speed, also act on the vanes of the monitoring device to eliminate any apparent slippage. Also, since the whole core is rotating as a solid body and the outer periphery of the vane is within said core, there are substantially no differential angular velocities to vary the rotation of the vane with regard to any portion of said core. It follows that from this rotating or oscillating vane an accurate count can be detected which represents the integral of the input signals, since as will be remembered, angular momentum has been conserved in the amplifier.

The device of the invention further incorporates several novel techniques to detect the rotations of the vane during the counting operation which preferably is to be performed by a positive-negative counter; that is, a counter which increases its count by one increment each time it receives a positive pulse and decreases its count one increment each time it receives a negative pulse. The preferred technique utilizes a polarized vane to activate an adjacent electrical coil in either a positive or negative sense. Another embodiment of the invention includes reflector means on the rotating vane to activate photocell means by reflection of light. Finally, a radially rotating fluid stream accompanying the vane can be directed to stationary duct means to produce the appropriate counting signal.

According to the invention, a liquid may be used as the working medium, but as a rule it is more advantageous to use a gas, such as air, and the following description will, therefore, relate to the device wherein air is used. However, it is to be understood that in certain cases, a liquid is desired in order to take advantage of the higher viscosity which causes a more powerful response in the device.

A device of this invention has been found to be a highly precise and accurate integrator confirming the lock-on effects of the vortex core with respect to the rotating vane, thus avoiding the previous difficulties caused by lack of sensitivity of integrators of the "motor" type. Other results and advantages, as will be apparent to those skilled in this art, include an ability to detect and thus integrate low level signals and an ability to store the integrated signal for a short expanse of time in the integrator itself.

Accordingly, an object of the present invention is to provide a fluid vortex integrator.

Another object of the present invention is to provide a device for performing the integration function utilizing a vortex amplifier and a rotation detector and counter.

Still another object of the present invention is to provide a vortex amplifier integrator with a rotating device that is positioned in the region of forced vortex flow and high viscous coupling whereby it is substantially rigidly coupled to the output flow.

Still a further object of the present invention is to provide an integrator comprising a vortex amplifier with a freely rotatable means rigidly coupled to the forced vortex core of said amplifier, and adjacent detection means for detecting rotation of said means and thus the precise rotation of the forced vortex core, which represents the integral of the input signals of the amplifier.

The above and still further objects, features and advantages of the present invention will become apparent upon consideration of the following detailed description of one specific embodiment thereof, especially when taken in conjunction with the accompanying drawings, wherein.

Figure 1:
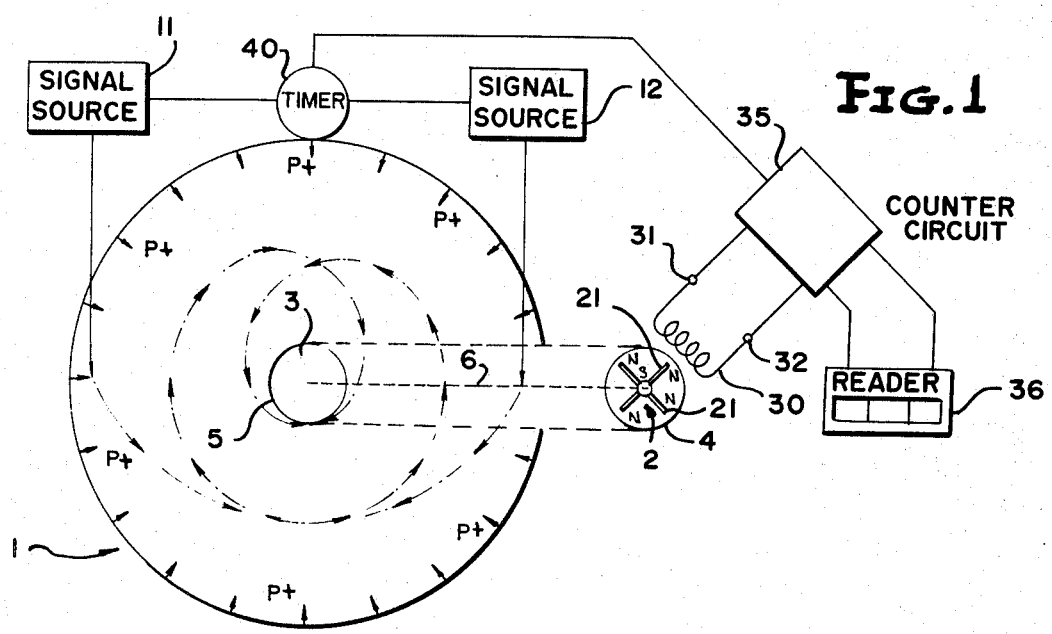
FIGURE 1 is a schematic illustration of the entire integrator device of the present invention in its preferred form.
Figure 2:
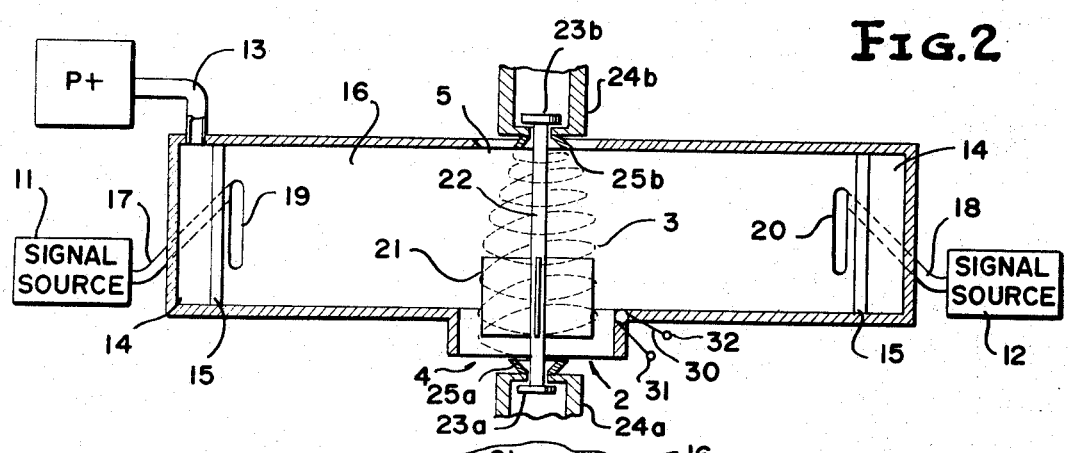
FIGURE 2 is a partially cut away illustration in cross-section of a subcombination portion of the device of FIGURE 1.

Referring now to the accompanying drawings and, more particularly, to FIGURES 1 and 2, a vortex amplifier, generally designated by reference numeral 1, is provided in the preferred form with a rotating vane structure, generally indicated by reference numeral 2 to monitor the output flow of said amplifier. As best illustrated in FIGURE 2, the rotating vane 2 is positioned within the region of forced vortex flow 3 existing between outlet apertures 4, 5 and is thus substantially rigidly coupled to the output flow of the amplifier as will be seen later in detail and as indicated by the dashed line 6 in FIGURE 1. A homogeneous fluid power supply, indicated generally by the arrows P+, provides fluid to the plenum and signal sources 11, 12 which provide the control function of the amplifier by imparting tangential rotation to the fluid in a manner generally well known to those skilled in this art and to be discussed now.

In FIGURE 2, the fluid supply P+ is fed via pipe 13 to an annular passageway 14 and thence through an annular porous wall 15 to vortex chamber 16. However, pipes or ducts 17 and 18 convey the control signals from the sources 11 and 12, respectively, directly to the vortex chamber 16 by way of elongated nozzle orifices 19 and 20 formed in the porous wall 15. The porous wall 15 serves to give the fluid from the power supply P+ the homogeneous radial component of velocity and thus prevents the fluid from entering the vortex chamber 16 with a tangential velocity component whereby the fluid streams issuing from the nozzle orifices 19 and 20 control any rotation of the fluid in the vortex chamber 16.

The rotor vane 2 is designed for free rotation with the forced vortex core 3 of the amplifier and, for this purpose, it has preferably four driving panel members 21 extending perpendicular to and fixed to a supporting shaft 22, which has enlarged heads 23a and 23b at opposite ends. The shaft 22 extends through apertures in supporting cups 24a and 24b, which in combination with the heads 23a, 23b form aerodynamic bearings for the monitoring vane 2. During operation, the air from the amplifier is forced between the heads 23a, 23b and the associated cup 24a, 24b, respectively, by funnel portions 25a, 25b, respectively, whereby the shaft rotates freely on a continuous blanket of air exhausting from the amplifier outlets 4, 5.

Although the preferred embodiment of the invention is illustrated with four panel members 21, any number of panel members can be employed as desired. Normally, at least two are used in order to balance the rotor vane structure 2 and prevent vibrations and in order to obtain sufficient driving surface for efficient rotation of said structure.

All of the driving surfaces of the panels 21, if extended, pass through the central axis and are parallel to the axial component of flow from the amplifier 1 so that the rotation of the vane structure 2 depends solely on the rotational component of the forced vortex core 3 and, thus, is immune to the axial component. The panels 21 in the preferred embodiment can be of any suitable material capable of magnetic polarization, such as stainless steel, "Alnico" or the like, so that a rotating magnetic field can be produced which is equivalent to the rotating fluid field. The panel members 21 can be made relatively thin so as to reduce inertia effects during sudden accelerations which might occur.

Thus, according to my invention, the rotational component of the flow virtually "locks on" each of the panel members 21. This important feature of my invention results from the fact that the solid body rotation of the forced vortex core 3 of the amplifier completely encompasses all of the driving surfaces of each of said members 21. At the high velocities encountered in the forced vortex core 3, the apparent viscosity is very high, and the viscous coupling forces tend to carry the vane structure 2 along with the rotating output flow without slippage. The outer limit of solid body rotation and thus, of the forced vortex core 3; that is, the maximum annular ring velocity (tangential and angular) occurs slightly inside the radius of the outlet aperture 4, 5 and since at the smaller radii of the rotating core 3 within said outlet aperture, the rotation is maintained in solid body or "wheel" rotation, then the angular velocity throughout is a constant. Accordingly, the outer periphery of the vane structure 2 is within or determined by this radius of maximum velocity, so that said vane structure 2 is positioned for maximum sensitivity because of the rigid coupling effect caused by high shear forces in the output flow. Also, the vane structure 2 is positioned in the aperture 4, 5 and at least a portion of said vane extends into the chamber 16 so that the amplifier flow is monitored before the axial component of flow has accelerated to a large velocity. This arrangement is preferred since it is believed that a portion of the rotational component of flow is dissipated, or at least it has been found to be hard to accurately detect after the axial component has reached the extreme velocities that occur some distance downstream of the aperture 4, 5. Thus, as illustrated, the vane 2 is within the confines of the chamber 16 where the axial component of flow due to the "sink" effect is nil and where the delicate vane 2 is protected from outside forces.

Further, it can be seen that there are no differential angular velocities to disturb the rigid coupling relationship set up by the high viscous coupling forces in the forced vortex core 3. Still another way of looking at it is that within the forced vortex core 3 of the outlet aperture 4, the annular velocities being the same, the pressures on all of the driving surfaces of the vane structure 2 encourage rotation of said structure as though rigidly coupled to the rotational component of the output flow.

Thus, it can be seen that my rotor vane structure 2 is so constructed and positioned as to maximize precise and accurate readout of the rotational output signal of the amplifier. Unlike previous rotor structures in "motor" integrator devices, the rotor 2 of my invention is rigidly coupled to the output flow and is afforded no resistance to following the flow by differential velocities, so that an accurate indication can be detected to indicate the integral of the input signal or signals.

In the preferred embodiment of FIGURES 1 and 2, a coil of wire 30 is positioned adjacent the outer extension of the panel members 21 of the vane structure 2 for detecting the sense of rotation of said vane 2 and the number of revolutions it makes in each direction. As will be remembered, the members 21 are magnetically polarized, which can be done in any number of ways. Any suitable arrangement of the poles is satisfactory as shown for example in FIGURE 1, with the north pole of each of the members being at the outer periphery of the vane structure 2, as illustrated. As each member 21 moves in an arc past the coil 30, an electrical current pulse is induced therein, the polarity of the output signal at leads 31, 32 being dependent upon the direction of movement past the coil 30. As illustrated, there will be four output pulses per revolution of the vane 2, although other output signal frequencies could obviously be induced by varying the number of panel members 21 and/or the polarity of said members.

The output leads 31, 32 are connected to an electronic counter apparatus or circuit of the positive-negative type, indicated generally by reference numeral 35 (FIGURE 1), which has a reader panel 36. For purposes of illustration, let us say that a positive pulse in the coil 30 corresponds to counterclockwise rotation of the vane 2 and a negative pulse corresponds to clockwise rotation. These pulses are fed to the positive-negative counter circuit 35, which may or may not include an amplifier, where the counter increases the count by one increment each time it receives a positive pulse and decreases by one increment each time it receives a negative pulse. Thus, the aggregate number of positive and negative pulses is obtained at the reader panel 36 which reads in terms of the integral of angular momentum introduced into the amplifier 1 by the signal sources 11, 12 as explained above.

In FIGURE 1, a timer 40 has been shown, to coordinate the fluid signals introduced at the signal sources 11, 12 and the counter 35. Since the vortex amplifier has a built-in delay or memory characteristic represented by the time it takes for the fluid to pass through the amplifier 1, the timer 40 may have a delay device to correspond to this amplifier delay in order to integrate over a particular time $dt$. As will be evident to those skilled in this art, this memory characteristic of my integrator apparatus may be particularly advantageous where it is desired to store the input signals for a given increment of time before the integral is read out.

In operation then, a fluid signal can be introduced into the apparatus by either or both of the signal sources 11, 12 and in both cases an accurate representation of the integral of the input momentum can be obtained with my device. To illustrate this, assume that as soon as the inlet flow signal is introduced into the vortex chamber 16 at an angle to the flow of the sheet of power fluid, signal "smearing" or smoothing immediately begins to occur, i.e. the signal fluid begins to share its momentum with the adjacent power fluid and other fluid signals present in the plenum. As the fluid moves to the center, as generally shown by the heavy flow arrows of FIGURE 1, the strength or amplitude of the fluid signal is attenuated but because of the law of conservation of energy or momentum the net rotation of the outlet monitoring vane 2 is tied to the net inlet flow signal, i.e. the integral of the inlet flow signal is represented by the rotation of the vane 2. If the inlet flow signal is in a pulse form, the smoothing of the signal in the vortex chamber is of particular advantage since the original sudden or large accelerations at the inlet due to the pulsations are accordingly attenuated whereby the integral can be even more accurately determined since the possibility of slippage between the rotating field and my monitoring vane 2 is further reduced.

More particularly, referring again to FIGURE 1, consider a fluid signal being introduced at signal source 11, so that the combined signal and power flow proceed in a vortex path, as well represented by the solid flow arrows. Further, consider that there is no fluid flow at signal source 12 so that the signal is not directly opposed in its travel to the outlet apertures 4, 5. The momentum ($mv$) of the inlet flow signal, either in continuous or pulse form, is shared with the surrounding homogeneous sheet of power fluid and thus smeared or stretched by shear forces. Accordingly, the velocity ($v$) of the original increment of fluid is reduced at any particular point in the chamber 16 from what it would have been had there been no resistance to flow to the extent of, say, one-half, but the integral of momentum ($\int v \cdot dm$) is retained since the mass ($m$) now involved in the signal has doubled through smearing.

The same analysis holds for the case where signal flow is introduced at both sources 11 and 12. In this case, however, the flow from source 12, as represented by the heavy dashed lines of FIGURE 1, interacts with the signal flow from source 11 as well as the power flow, thereby causing additional smearing of the signals. As in the former case, however, the net rotation of the outlet vane is tied to the net angular momentum which has traveled through the amplifier 1. Therefore, the net amount of positive and negative pulses received by the counter 35, 36 is the integral of the input signals at 11, 12, with the sign of the output (+ or −) indicating the particular signal that is predominating.

In the device of the present invention, rotation of the rotor vane 2 represents the maximum amplified version of the input signal or signals, since as will be remembered the angular velocity at the output aperture is at a maximum value which is many times that of the velocity of the input signal, and therefore, the device exhibits possibilities of a degree of sensitivity previously unattainable in known integrators of the motor type. For example, it has been found that if the vortex chamber 16 has a 4-inch outer diameter (inner diameter of the porous wall 15) and a 0.040-inch diameter centrally located output aperture 4, the amplifier acts as a 10,000 to 1 coupling between the rotating vane 2 and the fluid flow at said outer diameter. That is, an input flow rate of 0.001 revolution per second results in an output flow rate of ten revolutions per second, and accordingly, the integral of the input flow at the signal source 11 and/or 12 when $dt$ equals one-tenth second is represented by one revolution of the vane structure 2. Thus, 0.0001 of a revolution at the outer diameter of the vortex is detected by one revolution of the vane 2 and finally, since there are four panel members 21 of the vane structure 2 and, therefore, four pulses per revolution of the vane, one counter increment corresponds to 0.000025 revolution of the fluid flow being detected, which clearly represents an especially high level of sensitivity.

From the foregoing discussion, it is evident that the angular velocity of the vane structure 2 may be of such extreme proportions that the operation of my device may be limited by the speed of available counters. In such a case, it has been found that a particular advantage can be gained from my device by utilizing one of the signal sources 11 or 12 as a bias, whereby a constant of integration is merely added to the output.

Figure 3:
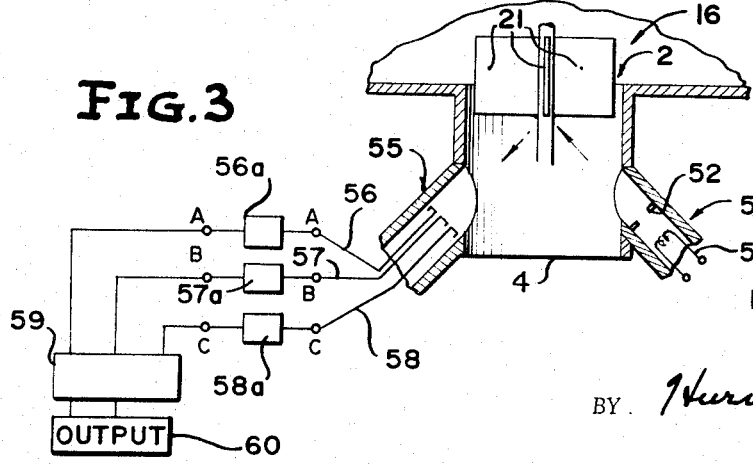
FIGURE 3 is a partially cut away and enlarged illustration of a possible modification of a portion of the device of FIGURE 1.

Additional subcombination structure to detect the rotation of the vane structure 2 is shown in FIGURE 3, and contains a light source 50 having a filament 51 for projecting a beam of light through a suitable lens 52 toward the vane structure 2 and a light receiver 55 having three different fiber optic terminals 56, 57 and 58, such as Lucite rods, and associated photocells 56a, 57a, 58a, for generation of three different outputs, represented by A, B and C. In this arrangement, the panel members 21 are made of a suitable light reflecting material whereby the light beam from source 50 is reflected by a portion of each of the panel members 21, such as the bottom, as indicated, so that the reflected beam sweeps across the receiver 55 intermittently activating each of the photocells 56a, 57a, 58a four times for each revolution of the vane structure 2. The signals from outputs A, B, C are transmitted to amplifier circuit 59, which is sensitive to forward and reverse rotation, whereby an appropriate signal for either forward or reverse count is fed to counter-reader output 60.

One outstanding advantage of this detecting structure over the preferred embodiment of FIGURE 1 is that there is absolutely no resistance to rotation of the vane structure 2 produced when the light beam is reflected from the panel member 21, as is the case to a limited extent when electron flow must be induced in the coil 30. As before, the vane structure 2 tends to follow the rotation of the vortex core 3 as though rigidly coupled to a solid body in accordance with my invention.

Figure 4:
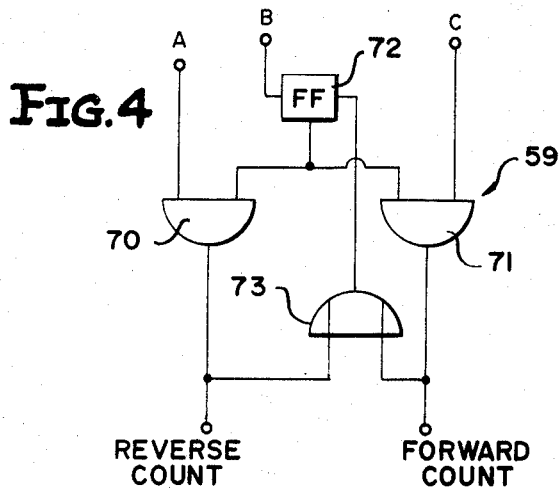
FIGURE 4 is a diagrammatic block illustration of a subcombination portion of the device of FIGURE 3.

FIGURE 4 shows a practical arrangement for the amplifier circuit 59 just mentioned. The arrangement has AND gates 70, 71, flip-flop 72, and OR gate 73 interconnected in the manner shown. When the center output B from the receiver 55 is in the energized state or a binary "one" condition by reflection of the light source 50 by one of the panel members 21, it tells the rest of the logic circuit through activation if the flip-flop 72 to set the AND gates 70, 71 to count the next time either output A or output C is energized. If A is first to be energized after B has been set, the counter-reader 60 subtracts one count indicating clockwise rotation of the vane 2. Similarly, if C is the first to be energized after B, then the counter 60 is told to advance or add one count due to counterclockwise rotation of the vane 2. The OR gate 73 serves to reset the flip-flop 72 so that no new count is accepted through the AND gates 70, 71 until B is energized anew by the next sweep of the receiver 55 by the reflected light source 50.

Figure 5A:
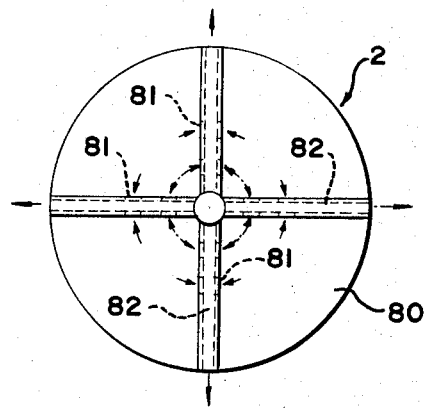
FIGURES 5 and 5a are schematic illustrations of a possible modification of a portion of the device of FIGURE 3.
Figure 5:
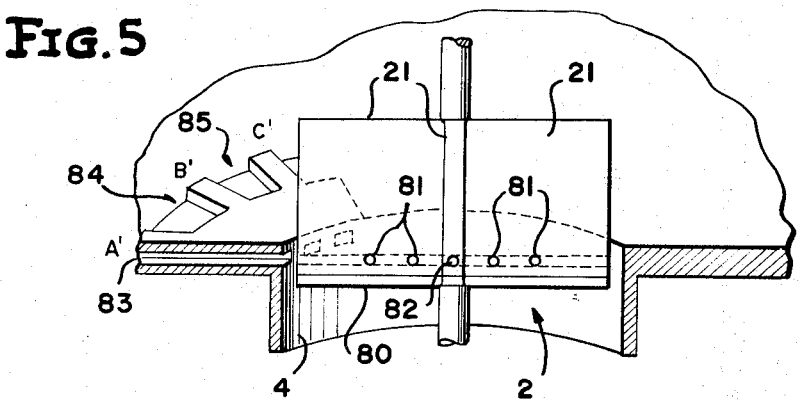

Other suitable subcombination structure to detect the rotation of the vane 2 is illustrated in FIGURES 5 and 5a. This particular arrangement requires no fluid-electrical interface since the detection and amplification function is performed by pure fluid elements, and a suitable fluid counter is or may be employed for the counting operation. The arrangement has an end plate 80 mounted on the vane structure 2 to partially restrict flow from the vortex chamber so that a high total pressure exists at the outlet aperture 4. This pressure head forces fluid into any number of apertures 81 in the sides of each of the panels 21, as best shown in FIGURE 5a, and out longitudinal channels 82 with which they communicate. Then the fluid stream impinges on receiving ducts 83, 84 and 85 thereby generating intermittent binary "one" signals at fluid outputs A', B', C'.

Figure 6:
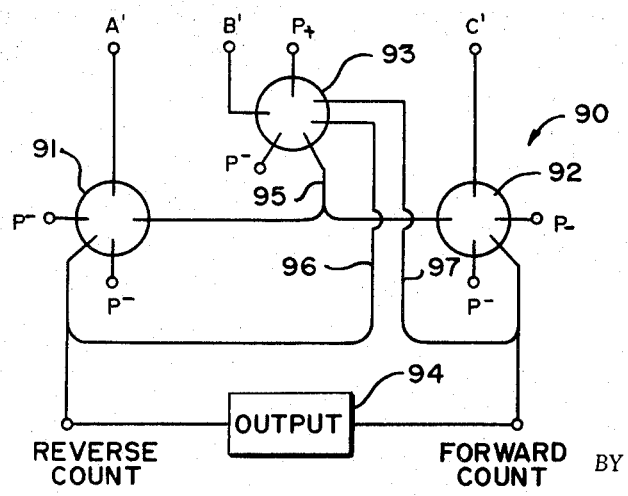
FIGURE 6 is a diagrammatic block illustration of a subcombination portion of the device of FIGURE 5.

The receivers 83–85 are connected to fluid amplifier circuit 90 in a manner similar to the embodiment of FIGURE 3. This circuit 90 is illustrated in FIGURE 6 and has passive AND elements 91, 92, flip-flop element 93 and counter-reader output 94. In operation, the instant the center output B' from the recever 84 is in the energized state or a binary "one" condition by the excursion of a fluid stream through it, the rest of the circuit is activated by the bi-stable flip-flop 93 whose power stream is now deflected from dump P— to set passage 95. The AND elements 91, 92 are thus set to produce a count signal the next time either of the vortex amplifier outputs A' or C' is energized, since the output stream at either A' or C' and the set stream in the passage 95 provides the count signal stream up the middle of either of said AND elements according to which one is activated first after the circuit is set. If A' is first, counter-reader output 94 subtracts one count indicating clockwise rotation of the vane 2, and similarly, if C' is first, then one count is added, just as in the FIGURE 3 embodiment. A feedback arrangement is provided through feedback channels 96, 97 which serves to switch the power stream of the bi-stable flip-flop 93 back to the inactive position so that no new count is accepted through the AND elements 91 or 92 until output B' is energized anew by the next sweep of a channel 82 past the receiving ducts 83–85.

An alternative arrangement of the FIGURE 5 embodiment would be to place an additional end plate and associated apertures and channels at the other end of the vane structure 2 and thus provide additional output signal generating apparatus at the aperture 5, so that a separate and additional detecting and counting operation could be performed, but as can be seen, the arrangement of FIGURE 5 can supply the preferred four pulses per revolution without this additional apparatus. The alternative arrangement may be preferred, however, where it is found to be hard to discriminate between the fluid pulses arriving in rapid succession at a single detecting and counting station. This idea of providing additional detecting and counting stations could also be applied to the other embodiments if desired.

While I have described and illustrated several specific embodiments of my invention, it will be clear that variation of the details of construction which are specifically illustrated and described may be resorted to without departing from the true spirit and scope of the invention as defined in the appended claims.

What I claim is:

1. A vortex device for performing an integration function, comprising a vortex chamber having a central axis, means positioned generally adjacent the periphery of said chamber and adapted to issue a sheet of fluid into said chamber with substantially no tangential velocity relative to said chamber, control means associated with said chamber for imparting a tangential velocity to said sheet of fluid in accordance with an input signal, an outlet aperture formed in said chamber along said central axis for egress of said fluid with fluid characteristics including presence of a core of forced vortical flow and high viscous coupling generally defined by the area of said aperture, said core of forced vortical flow having both a rotational component of flow and axial components relative to said central axis in the presence of said input signal, fluid driven rotor means responsive only to said rotational component of flow of said core of forced vortical flow, the outer periphery of said rotor means being wholly within said core of forced vortical flow and high viscous coupling and being located primarily in said chamber whereby said rotor means is substantially rigidly coupled to said rotational component of fluid flow and detecting means for sensing the rotation of said rotor means.

2. The combination of claim 1 wherein is further provided counting means responsive to said detecting means.

3. The combination of claim 2 wherein said control means comprise control ducts adapted to issue control streams into said chamber.

4. The combination according to claim 3 wherein said control ducts are positioned in a generally opposed relationship.

5. The combination of claim 4 wherein said counting means comprises an amplifier circuit sensitive to direction of movement of said rotor means generated by the control streams of said opposed ducts and a positive-negative counter to count the net rotations of said rotor means in response to count signals from said amplifier circuit.

6. The combination according to claim 5 wherein said detecting means comprises three separate outputs for generation of a succession of three detection signals in response to movement of said rotor means past said outputs and said amplifier circuit comprises two AND gates for generation of said count signals, each of said AND gates being adapted to receive one of said detection signals, and a flip-flop adapted to set each of said AND gates for the counting operation in response to another of said detection signals.

7. The combination of claim 1 wherein said rotor means is positioned in said aperture and at least a portion of said rotor means extends into said chamber.

8. The combination of claim 1 wherein said rotor means is suspended for substantially free rotation by fluid bearing means.

9. The combination according to claim 5 comprising a first fluid bearing for said rotor, said bearing being located downstream of said egress orifice and in flow communication therewith so that fluid passing through said egress orifice supplies the fluid necessary for operation of said fluid bearing.

10. The combination according to claim 9 comprising a second axial egress orifice for fluid in said chamber, and a second fluid bearing for said rotor located downstream of and in flow communication with said second egress orifice.

11. The combination of claim 1 wherein said rotor means is magnetically polarized to generate a rotating magnetic field and said detecting means comprises an electrical coil positioned adjacent said magnetic field whereby an electrical current is generated in response to rotation of said rotor means.

12. The combination of claim 1 wherein said rotor means comprises radially extending channel means for generating a radial fluid stream from said flow, and said detecting means comprises receiving duct means positioned adjacent the periphery of said outlet and in the plane with said channel means for receiving said radial fluid stream.

13. The combination of claim 1, wherein a portion of said rotor means is provided with light reflective material and said detecting means comprises light source means directed toward said panel members so as to intersect said portion and associated light receiving means directed toward said rotor means to receive the succession of light beams reflected by said portion of said rotor means upon rotation of the latter.

14. A vortex amplifier, comprising a vortex chamber having an axis, an outlet aperture for said vortex chamber located on said axis, means inducing vortical flow of fluid in said chamber thereby forming a core of forced flow of solid body rotation of said fluid internally of said vortex chamber, wherein angular velocity of said core is constant with respect to radius of said core and tangential velocity of fluid in said core is a direct function of radius of said core, said chamber being dimensioned such that a core of relatively uniform diameter is formed and means for producing an output in response solely to the angular velocity of said core said last-mentioned means including rotation sensing means having an axial location primarily in said chamber and a radial location wholly within the core.

15. The combination according to claim 14 wherein said rotation sensing means includes a rotor coupled only to said core.

16. The combination according to claim 15 wherein is further included means for integrating the rotations of said rotor.

17. A vortex amplifier, comprising a fluid vortex chamber having an axis, an egress orifice for fluid egressing from said chamber, said egress orifice being concentric with said axis, means inducing vortical flow of said fluid in said chamber, thereby forming a core of forced flow in solid body rotation of fluid internally of said chamber, wherein angular velocity of fluid in said core is constant with respect to radius of said core, said chamber being dimensioned such that a core of relatively uniform diameter is formed and means for measuring said angular velocity said last-mentioned means including rotation sensing means having an axial location primarily in said chamber and a radial location wholly within the core.

18. A vortex amplifier, comprising a fluid vortex chamber having an axis, an egress orifice for fluid egressing from said chamber, said egress orifice being concentric with said axis, means inducing vortical flow of said fluid in said chamber, thereby forming a core of forced flow in solid body rotation of fluid internally of said chamber, wherein angular velocity of fluid in said core is constant with respect to radius of said core, said chamber being dimensioned such that a core of relatively uniform diameter is formed and means responsive only to said core for integrating said angular velocity said last-mentioned means including rotation sensing means having an axial location primarily in said chamber and a radial location wholly within the core.

19. The combination according to claim 18 wherein said rotation sensing means includes a mechanical rotor coupled only to said core.

20. The combination according to claim 19 wherein is further included fluid bearing means for said rotor.

21. The combination according to claim 19 comprising a first fluid bearing for said rotor, said bearing being located downstream of said egress orifice and in flow communication therewith so that fluid passing through said egress orifice supplies the fluid necessary for operation of said fluid bearing.

22. The combination according to claim 21 comprising a second axial egress orifice for fluid in said chamber, and a second fluid bearing for said rotor located downstream of and in flow communication with said second egress orifice.

References Cited

UNITED STATES PATENTS

| 2,215,447 | 9/1940 | Kollsman | 33—204 |
| 3,203,237 | 8/1965 | Ogren | 137—81.5 X |
| 3,207,168 | 9/1965 | Warren | 137—81.5 X |
| 3,213,682 | 10/1965 | Gongwer | 137—81.5 X |
| 3,230,765 | 1/1966 | Senstad | 73—505 X |
| 3,240,060 | 3/1966 | Doyle | 73—194 |

FOREIGN PATENTS

| 1,318,907 | 11/1963 | France. |
| 874,464 | 5/1960 | Great Britain. |

RICHARD B. WILKINSON, *Primary Examiner.*

W. F. BAUER, L. R. FRANKLIN, *Assistant Examiners.*